US012169911B2

United States Patent
Aberman et al.

(10) Patent No.: US 12,169,911 B2
(45) Date of Patent: *Dec. 17, 2024

(54) FACIAL IMAGE EDITING AND ENHANCEMENT USING A PERSONALIZED PRIOR

(71) Applicant: Google LLC, Mountain View, CA (US)

(72) Inventors: Kfir Aberman, San Mateo, CA (US); Yotam Nitzan, Tel Aviv (IL); Orly Liba, Palo Alto, CA (US); Yael Pritch Knaan, Tel Aviv (IL); Qiurui He, Sunnyvale, CA (US); Inbar Mosseri, Raanana (IL); Yossi Gandelsman, Berkeley, CA (US); Michal Yarom, Shoham (IL)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/334,700

(22) Filed: Jun. 14, 2023

(65) Prior Publication Data

US 2023/0325998 A1 Oct. 12, 2023

Related U.S. Application Data

(63) Continuation of application No. 17/982,842, filed on Nov. 8, 2022, now Pat. No. 11,721,007, which is a (Continued)

(51) Int. Cl.
G06T 5/00 (2024.01)
G06T 3/40 (2006.01)
G06T 5/50 (2006.01)

(52) U.S. Cl.
CPC ............ *G06T 5/50* (2013.01); *G06T 3/40* (2013.01); *G06T 5/00* (2013.01); *G06T 2207/20081* (2013.01); *G06T 2207/20084* (2013.01)

(58) Field of Classification Search
CPC .......... G06N 20/00; G06N 3/08; G06N 3/045; G06T 2207/20081; G06T 2207/20084; G06V 10/82
See application file for complete search history.

(56) References Cited

U.S. PATENT DOCUMENTS

| 11,341,699 B1 | 5/2022 | Gottlieb |
| 11,537,813 B1 | 12/2022 | Kviatkovsky et al. |
| 2022/0277431 A1 | 9/2022 | Tensmeyer et al. |

OTHER PUBLICATIONS

Richardson, Elad, et al. "Encoding in style: a stylegan encoder for image-to-image translation." Proceedings of the IEEE/CVF conference on computer vision and pattern recognition. 2021.*

(Continued)

*Primary Examiner* — Li Liu
(74) *Attorney, Agent, or Firm* — Botos Churchill IP Law LLP

(57) ABSTRACT

Systems and methods for identifying a personalized prior within a generative model's latent vector space based on a set of images of a given subject. In some examples, the present technology may further include using the personalized prior to confine the inputs of a generative model to a latent vector space associated with the given subject, such that when the model is tasked with editing an image of the subject (e.g., to perform inpainting to fill in masked areas, improve resolution, or deblur the image), the subject's identifying features will be reflected in the images the model produces.

19 Claims, 11 Drawing Sheets

Related U.S. Application Data continuation of application No. PCT/US2022/011807, filed on Jan. 10, 2022.

(56) References Cited

OTHER PUBLICATIONS

Abdal, Rameen, Yipeng Qin, and Peter Wonka. "Image2stylegan: How to embed images into the stylegan latent space?." Proceedings of the IEEE/CVF international conference on computer vision. 2019.*

"Convex combination." Wikipedia.com. Downloaded from https://en.wikipedia.org/wiki/Convex_combination on Dec. 2, 2021. 2 Pages.

"Convex hull." Wikipedia.com. Downloaded from https://en.wikipedia.org/wiki/Convex_hull on Dec. 2, 2021. 18 Pages.

International Search Report and Written Opinion for Application No. PCT/US22/11807 dated Sep. 6, 2022 (13 pgs.).

Alaluf, Yuval, et al., HyperStyle: StyleGAN Inversion with HyperNetworks for Real Image Editing. 2021, arXiv:2111.15666v2, 27 Pages.

Alaluf, Yuval, et al., ReStyle: A Residual-Based StyleGAN Encoder via Iterative Refinement. 2021, arXiv:2104.02699, 35 Pages.

Asim, Muhammad, et al., Invertible Generative Models for Inverse Problems: Mitigating Representation Error and Dataset Bias. 2020, arXiv:1905.11672v4, 29 Pages.

Averbuch-Elor, Hadar, et al., Bringing Portraits to Life. 2017, ACM Transactions on Graphics (TOG), vol. 36, Issue 6, 13 Pages.

Basilico, Justin, et al., Artwork Personalization at Netflix. https://netflixtechblog.com/artwork-personalization-c589f074ad76, 2021. Accessed: Jan. 2022.

Bau, David, et al., Semantic Photo Manipulation with a Generative Image Prior. 2020, arXiv:2005.07727v2, 11 Pages.

Bermano, Amit H, et al., State-of-the-Art in the Architecture, Methods and Applications of StyleGAN. 2022, arXiv:2202.14020v1, 19 Pages.

Blau, Yochai, et al., The Perception-Distortion Tradeoff. 2020, arXiv:1711.06077v4, 18 Pages.

Bojanowski, Piotr, et al., Optimizing the Latent Space of Generative Networks. 2017, arXiv:1707.05776v2, 10 Pages.

Brock, Andrew, et al., Large Scale GAN Training for High Fidelity Natural Image Synthesis. 2018, arXiv:1809.11096v2, 35 Pages.

Cao, Kaidi, et al., Pose-Robust Face Recognition via Deep Residual Equivariant Mapping. 2018, arXiv:1803.00839v1, 10 Pages.

Cattiau, Julie, A Communication Tool for People with Non-standard Speech. 2021, Accessed Nov. 8, 2022, url: https://blog.google/outreach-initiatives/accessibility/project-relate/.

Chan, Kelvin C.K., et al., GLEAN: Generative Latent Bank for Large-Factor Image Super-Resolution. 2021, arXiv:2012.00739v1, 19 Pages.

Chandrashekar, Ashok, et al., Artwork Personalization at Netflix. Accessed: Jan. 2022. downloaded from the internet: https://netflixtechblog.com/artwork-personalization-c589f074ad76.

Choi, Yunjey, et al., StarGAN: Unified Generative Adversarial Networks for Multi-Domain Image-to-Image Translation. 2018, arXiv:1711.09020v3, 15 Pages.

Deng, Jiankang, et al., ArcFace: Additive Angular Margin Loss for Deep Face Recognition. 2019, CVPR, pp. 4690-4699.

Denton, Emily, et al., Detecting Bias with Generative Counterfactual Face Attribute Augmentation. 2019, arXiv:1906.06439v2, 11 Pages.

Denton, Emily, et al., Image Counterfactual Sensitivity Analysis for DetectingUnintended Bias, 2020, arXiv:1906.06439v3, 12 Pages.

Dolhansky, Brian, et al., Eye In-Painting with Exemplar Generative Adversarial Networks. 2018, arXiv:1712.03999v1, 10 Pages.

Donahue, Jeff, et al., Adversarial Feature Learning. 2017, arXiv:1605.09782v7, 18 Pages.

Floater, Michael S, Generalized Barycentric Coordinates and Applications. 2016, Acta Numerica, 24, 50 Pages.

Gal, Rinon, et al., StyleGAN-NADA: CLIP-Guided Domain Adaptation of Image Generators. 2021, arXiv:2108.00946v2, 25 Pages.

Ge, Shiming, et al., Occluded Face Recognition in the Wild by Identity-Diversity Inpainting. 2020, IEEE Transactions on Circuits and Systems for Video Technology, 30(10), pp. 3387-3397.

Geman, Stuart, et al., Stochastic Relaxation, Gibbs Distributions, and the Bayesian Restoration of Images. 1984, IEEE Transactions on Pattern Analysis and Machine Intelligence, vol. PAMI-6, No. 6, pp. 721-741.

Goodfellow, Ian, et al., "Generative Adversarial Nets", arXiv:1406.2661v1, 9 Pages (2014).

Gu, Jinjin, et al., Image Processing Using Multi-Code GAN Prior. 2020, Proceedings of the IEEE/CVF Conference on Computer Vision and Pattern Recognition, pp. 3012-3021.

Härkönen, Erik, et al., GANSpace: Discovering Interpretable GAN Controls. 2020, arXiv:2004.02546v3, 29 Pages.

He, Kaiming, et al., Single Image Haze Removal Using Dark Channel Prior. 2011, IEEE Transactions on Pattern Analysis and Machine Intelligence, vol. 33, No. 12, pp. 2341-2353.

Heusel, Martin, et al., GANs Trained by a Two Time-Scale Update Rule Converge to a Local Nash Equilibrium. 2017, arXiv:1706.08500v6, 38 Pages.

Hussein, Shady Abu, et al., Image-Adaptive GAN based Reconstruction. 2020, arXiv:1906.05284v2, 12 Pages.

Jiang, Yihan, et al., Improving Federated Learning Personalization via Model Agnostic Meta Learning. 2019, arXiv:1909.12488v1, 11 Pages.

Karras, Tero, et al., A Style-Based Generator Architecture for Generative Adversarial Networks. arXiv:1812.04948v2, Feb. 6, 2019. 12 Pages.

Karras, Tero, et al., A Style-Based Generator Architecture for Generative Adversarial Networks. 2018, arXiv:1812.04948v1, 12 Pages.

Karras, Tero, et al., A Style-Based Generator Architecture for Generative Adversarial Networks. 2019, arXiv:1812.04948v2, 12 Pages.

Karras, Tero, et al., Analyzing and Improving the Image Quality of StyleGAN. 2020, arXiv:1912.04958v2, 21 Pages.

Karras, Tero, et al., Progressive Growing of GANs for Improved Quality, Stability, and Variation. 2017, arXiv:1710.10196v3, 26 Pages.

Karras, Terro, et al., Training Generative Adversarial Networks with Limited Data. 2020, arXiv:2006.06676v2, 37 Pages.

Li, Xiaoming, et al., Enhanced Blind Face Restoration with Multi-Exemplar Images and Adaptive Spatial Feature Fusion. 2020, Proceedings of the IEEE/CVF Conference on Computer Vision and Pattern Recognition, pp. 2706-2715.

Li, Yijun, et al., Few-shot Image Generation with Elastic Weight Consolidation. 2020, arXiv:2012.02780v1, 12 Pages.

Liu, Ming-Yu, et al., Few-Shot Unsupervised Image-to-Image Translation. 2019, IEEE International Conference on Computer Vision (ICCV), pp. 10551-10560.

Luo, Xuan, et al., Time-Travel Rephotography. 2021, arXiv:2012.12261v2, 12 Pages.

Menon, Sachit, et al., PULSE: Self-Supervised Photo Upsampling via Latent Space Exploration of Generative Models. 2020 IEEE/CVF Conference on Computer Vision and Pattern Recognition (CVPR), pp. 2437-2445. Mar. 8, 2020. 9 Pages.

Mo, Sangwoo, et al., Freeze the Discriminator: a Simple Baseline for Fine-Tuning GANs. 2020, arXiv:2002.10964v2, 13 Pages.

Mokady, Ron, et al., Self-Distilled StyleGAN: Towards Generation from Internet Photos. 2022, arXiv:2202.12211v1, 11 Pages.

Nazeri, Kamyar, et al., EdgeConnect: Generative Image Inpainting with Adversarial Edge Learning. 2019, arXiv:1901.00212v3, 12 Pages.

Nitzan, Yotam, et al., Face Identity Disentanglement via Latent Space Mapping. 2020, arXiv:2005.07728v2, 17 Pages.

Ojha, Utkarsh, et al., Few-shot Image Generation via Cross-domain Correspondence. 2021, arXiv:2104.06820v1, 15 Pages.

Collins, Edo, et al., "Editing in Style: Uncovering the Local Semantics of GANs", Computer Vision Foundation, IEEE, 2020, pp. 5771-5780.

Guan, Shanyan, et al., "Collaborative Learning for Faster StyleGAN Embedding", arXiv:2007.01758v1 [cs.CV] Jul. 3, 2020, pp. 4321-4330.

(56) References Cited

OTHER PUBLICATIONS

Ling, Huan, et al., "EditGAN: High-Precision Semantic Image Editing", 35th Conference on Neural Information Processing Systems (NeurIPS 2021), pp. 1-15.

* cited by examiner

FACIAL IMAGE EDITING AND ENHANCEMENT USING A PERSONALIZED PRIOR

CROSS-REFERENCE TO RELATED APPLICATIONS

The present application is a continuation of U.S. application Ser. No. 17/982,842, filed Nov. 8, 2022, which a continuation of International Application No. PCT/US2022/011807, filed Jan. 10, 2022, the entire disclosures of which are hereby incorporated by reference.

BACKGROUND

Generative models can be utilized to perform tasks ranging from editing and enhancing images of a given subject to generating realistic images (or portions of an image) of a given subject or a synthetically generated subject. In order to sufficiently train such models, a large set of images is required, generally of a large set of subjects. As a result, when generative models are used to edit, enhance, or fill in a portion of an image of a known subject, they may produce images that appear realistic, but resemble a different subject.

BRIEF SUMMARY

The present technology concerns systems and methods for identifying a personalized prior within a generative model's latent vector space based on a set of images of a given subject. In some aspects, the present technology may further include using the personalized prior (e.g., a convex hull defined by a set of codes generated based on a set of the subject's images) to limit the codes input to the generative model so that the subject's identifying features will be reflected in the images the model produces. For example, a generative model may be configured to enhance or fill in facial features in an image of a subject where only partial cues related to the subject's identity are present (e.g., due to motion blur, low light, low resolution, occlusion by other objects). Without the present technology, the model may successfully enhance or fill in such an image, but may do so by producing an image that appears to be of a different subject. The present technology may be used to focus the generative model such that the images it produces will be more consistent with the subject's appearance.

In one aspect, the disclosure describes a computer-implemented method, comprising: (1) for each given image of a set of images of a subject, testing a plurality of codes, using one or more processors of a processing system, to identify an optimized code for the given image, comprising: (a) for each code of the plurality of codes: generating a first image using a generative model and the code; and comparing, using the one or more processors, the first image to the given image to generate a first loss value for the code; and (b) comparing, using the one or more processors, the first loss value generated for each code of the plurality of codes to identify the code having a lowest first loss value as the optimized code for the given image; and (2) generating, using the one or more processors, a personalized prior for the subject based on a convex hull including each optimized code identified for each given image of the set of images of the subject. In some aspects, the method further comprises: (1) for the optimized code identified for each given image of the set of images of the subject: generating a second image using the generative model and the optimized code; and comparing, using the one or more processors, the second image to the given image to generate a second loss value; and (2) modifying, using the one or more processors, one or more parameters of the generative model based at least in part on each generated second loss value to create a tuned generative model. In some aspects, the method further comprises: (1) identifying, using the one or more processors, a plurality of coefficient sets, each coefficient set of the plurality of coefficient sets corresponding to a code within the convex hull; (2) for each given coefficient set of the plurality of coefficient sets: generating, using the one or more processors, a third image using the tuned generative model and a given code corresponding to the given coefficient set; and comparing, using the one or more processors, the third image to at least a portion of an input image of the subject to generate a third loss value for the third image; and (3) comparing, using the one or more processors, the third loss value generated for each third image to identify the third image having a lowest third loss value as a personalized output image. In some aspects, the method further comprises: (1) identifying, using the one or more processors, a plurality of coefficient sets, each coefficient set of the plurality of coefficient sets corresponding to a code within the convex hull; (2) identifying, using the one or more processors, a plurality of code sets, each code set of the plurality of code sets including two or more individual codes, each individual code corresponding to a coefficient set of the plurality of coefficient sets; (3) for each given code set of the plurality of code sets: generating, using the one or more processors, a third image using the tuned generative model and the given code set, each individual code of the given code set being provided to a different layer or set of layers of the tuned generative model; and comparing, using the one or more processors, the third image to at least a portion of an input image of the subject to generate a third loss value for the third image; and (4) comparing, using the one or more processors, the third loss value generated for each third image to identify the third image having a lowest third loss value as a personalized output image. In some aspects, the method further comprises: (1) identifying, using the one or more processors, a plurality of coefficient sets, each coefficient set of the plurality of coefficient sets corresponding to a code within the convex hull; (2) for each given coefficient set of the plurality of coefficient sets: generating, using the one or more processors, a third image using the generative model and a given code corresponding to the given coefficient set; and comparing, using the one or more processors, the third image to at least a portion of an input image of the subject to generate a third loss value for the third image; and (3) comparing, using the one or more processors, the third loss value generated for each third image to identify the third image having a lowest third loss value as a personalized output image. In some aspects, the method further comprises: (1) identifying, using the one or more processors, a plurality of coefficient sets, each coefficient set of the plurality of coefficient sets corresponding to a code within the convex hull; (2) identifying, using the one or more processors, a plurality of code sets, each code set of the plurality of code sets including two or more individual codes, each individual code corresponding to a coefficient set of the plurality of coefficient sets; (3) for each given code set of the plurality of code sets: generating, using the one or more processors, a third image using the generative model and the given code set, each individual code of the given code set being provided to a different layer or set of layers of the generative model; and comparing, using the one or more processors, the third image to at least a portion of an input image of the subject to generate a third loss value for the third image; and (4) comparing, using the one or more processors, the third loss value generated for each third image to identify the third image having a lowest third loss value as a personalized output image. In some aspects, the plurality of coefficient sets includes a first coefficient set, and a plurality of successive coefficient sets selected based directly or indirectly on the first coefficient set using gradient descent. In some aspects, the input image of the subject includes a first portion of pixels preserved from an original image of the subject, and a mask in place of a second portion of pixels from the original image of the subject, and comparing, using the one or more processors, the third image to at least a portion of the input image of the subject to generate the third loss value for the third image comprises comparing the third image to the first portion of pixels to generate the third loss value for the third image. In some aspects, the input image has a first resolution, and the personalized output image has a second resolution that is higher than the first resolution. In some aspects, the plurality of codes includes a first code, and a plurality of successive codes selected based directly or indirectly on the first code using gradient descent. In some aspects, the first code represents a mean of a latent vector space W, the latent vector space W representing all possible codes that can be input into the generative model.

In another aspect, the disclosure describes a processing system comprising: a memory storing a generative model; and one or more processors coupled to the memory and configured to perform any of the methods just described.

In another aspect, the disclosure describes a processing system comprising: (1) a memory storing a generative model; and (2) one or more processors coupled to the memory and configured to generate a personalized prior for a subject for use with the generative model, comprising: (a) for each given image of a set of images of the subject, testing a plurality of codes to identify an optimized code for the given image, comprising: (i) for each code of the plurality of codes: generating a first image using the generative model and the code; and comparing the first image to the given image to generate a first loss value for the code; and (ii) comparing the first loss value generated for each code of the plurality of codes to identify the code having a lowest first loss value as the optimized code for the given image; and (b) generating the personalized prior for the subject based on a convex hull including each optimized code identified for each given image of the set of images of the subject. In some aspects, the one or more processors are further configured to tune the generative model, comprising: (1) for the optimized code identified for each given image of the set of images of the subject: generating a second image using the generative model and the optimized code; and comparing, using the one or more processors, the second image to the given image to generate a second loss value; and (2) modifying, using the one or more processors, one or more parameters of the generative model based at least in part on each generated second loss value to create a tuned generative model. In some aspects, the one or more processors are further configured to generate a personalized output image based on an input image of the subject, comprising: (1) identifying a plurality of coefficient sets, each coefficient set of the plurality of coefficient sets corresponding to a code within the convex hull; (2) for each given coefficient set of the plurality of coefficient sets: generating a third image using the tuned generative model and a given code corresponding to the given coefficient set; and comparing the third image to at least a portion of the input image of the subject to generate a third loss value for the third image; and (3) comparing the third loss value generated for each third image to identify the third image having a lowest third loss value as a personalized output image. In some aspects, the one or more processors are further configured to generate a personalized output image based on an input image of the subject, comprising: (1) identifying a plurality of coefficient sets, each coefficient set of the plurality of coefficient sets corresponding to a code within the convex hull; (2) identifying a plurality of code sets, each code set of the plurality of code sets including two or more individual codes, each individual code corresponding to a coefficient set of the plurality of coefficient sets; (3) for each given code set of the plurality of code sets: generating a third image using the tuned generative model and the given code set, each individual code of the given code set being provided to a different layer or set of layers of the tuned generative model; and comparing the third image to at least a portion of the input image of the subject to generate a third loss value for the third image; and (4) comparing the third loss value generated for each third image to identify the third image having a lowest third loss value as a personalized output image. In some aspects, the one or more processors are further configured to generate a personalized output image based on an input image of the subject, comprising: (1) identifying a plurality of coefficient sets, each coefficient set of the plurality of coefficient sets corresponding to a code within the convex hull; (2) for each given coefficient set of the plurality of coefficient sets: generating a third image using the generative model and a given code corresponding to the given coefficient set; and comparing the third image to at least a portion of the input image of the subject to generate a third loss value for the third image; and (3) comparing the third loss value generated for each third image to identify the third image having a lowest third loss value as a personalized output image. In some aspects, the one or more processors are further configured to generate a personalized output image based on an input image of the subject, comprising: (1) identifying a plurality of coefficient sets, each coefficient set of the plurality of coefficient sets corresponding to a code within the convex hull; (2) identifying a plurality of code sets, each code set of the plurality of code sets including two or more individual codes, each individual code corresponding to a coefficient set of the plurality of coefficient sets; (3) for each given code set of the plurality of code sets: generating a third image using the generative model and the given code set, each individual code of the given code set being provided to a different layer or set of layers of the generative model; and comparing the third image to at least a portion of the input image of the subject to generate a third loss value for the third image; and (4) comparing the third loss value generated for each third image to identify the third image having a lowest third loss value as a personalized output image. In some aspects, the plurality of coefficient sets includes a first coefficient set, and a plurality of successive coefficient sets, and the one or more processors are further configured to select each coefficient set of the plurality of successive coefficient sets based directly or indirectly on the first coefficient set using gradient descent. In some aspects, the input image of the subject includes a first portion of pixels preserved from an original image of the subject, and a mask in place of a second portion of pixels from the original image of the subject, and comparing the third image to at least a portion of the input image of the subject to generate the third loss value for the third image comprises comparing the third image to the first portion of pixels to generate the third loss value for the third image. In some aspects, the one or more processors are configured to generate the personalized output image based on the input image of the subject, wherein the input image has a first resolution, and the personalized output image has a second resolution that is higher than the first resolution. In some aspects, the plurality of codes includes a first code, and a plurality of successive codes, and the one or more processors are further configured to select each code of the plurality of successive codes based directly or indirectly on the first code using gradient descent. In some aspects, the one or more processors are further configured to select a first code representing a mean of a latent vector space W, the latent vector space W representing all possible codes that can be input into the generative model.

DETAILED DESCRIPTION

Figure 1:
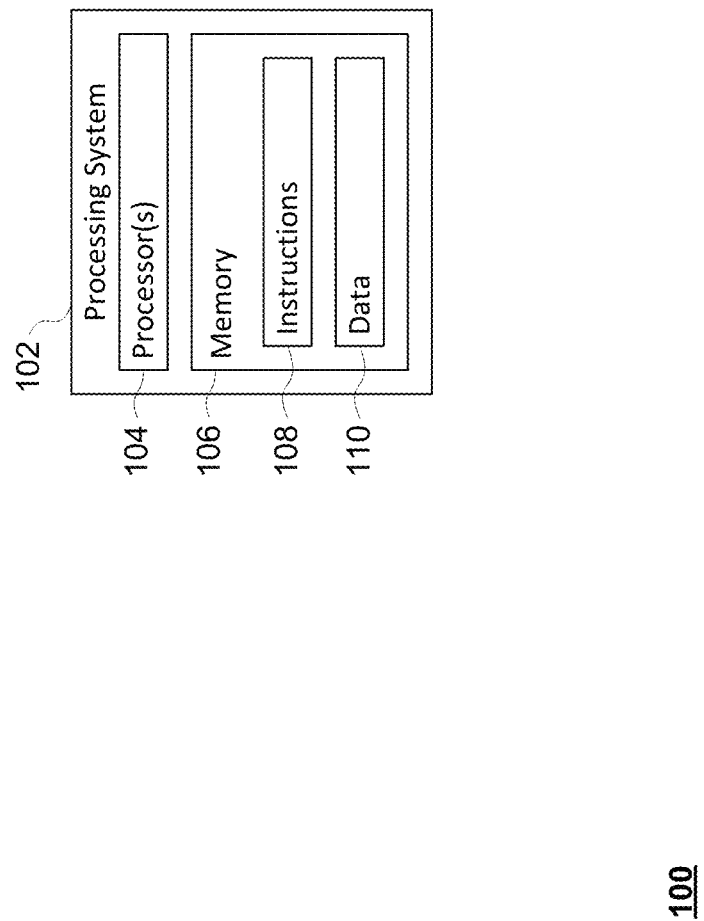
FIG. 1 is a functional diagram of an example system in accordance with aspects of the disclosure.

The present technology will now be described with respect to the following exemplary systems and methods. Reference numbers in common between the figures depicted and described below are meant to identify the same features.
Example Systems FIG. 1 shows a high-level system diagram 100 of an exemplary processing system 102 for performing the methods described herein. The processing system 102 may include one or more processors 104 and memory 106 storing instructions 108 and data 110. The instructions 108 and data 110 may include a generative model as described herein (e.g., generative model 306 of FIGS. 3A, 3B, 4A, 4B, 6, 10, and 11). In addition, the data 110 may store training examples to be used in training such a generative model, data to be used by the generative model when generating images, a set of images of a given subject, a personalized prior based on a set of images of a given subject (e.g., personalized prior 402 and 403 of FIGS. 4A, 4B, 6, 10, and 11), and/or the images output by the generative model.

Processing system 102 may be resident on a single computing device. For example, processing system 102 may be a server, personal computer, or mobile device, and the generative model and data associated with it may thus be local to that single computing device. Similarly, processing system 102 may be resident on a cloud computing system or other distributed system. In such a case, the generative model and/or data associated with it may be distributed across two or more different physical computing devices. For example, in some aspects of the technology, the processing system may comprise a first computing device storing the generative model, and a second computing device storing data to be used by the generative model when generating images, a set of images of a given subject, a personalized prior based on a set of images of a given subject, and/or the images output by the generative model. Likewise, in some aspects of the technology, the processing system may comprise a first computing device storing layers 1-$n$ of a generative model having m layers, and a second computing device storing layers n-m of the generative model.

Figure 2:
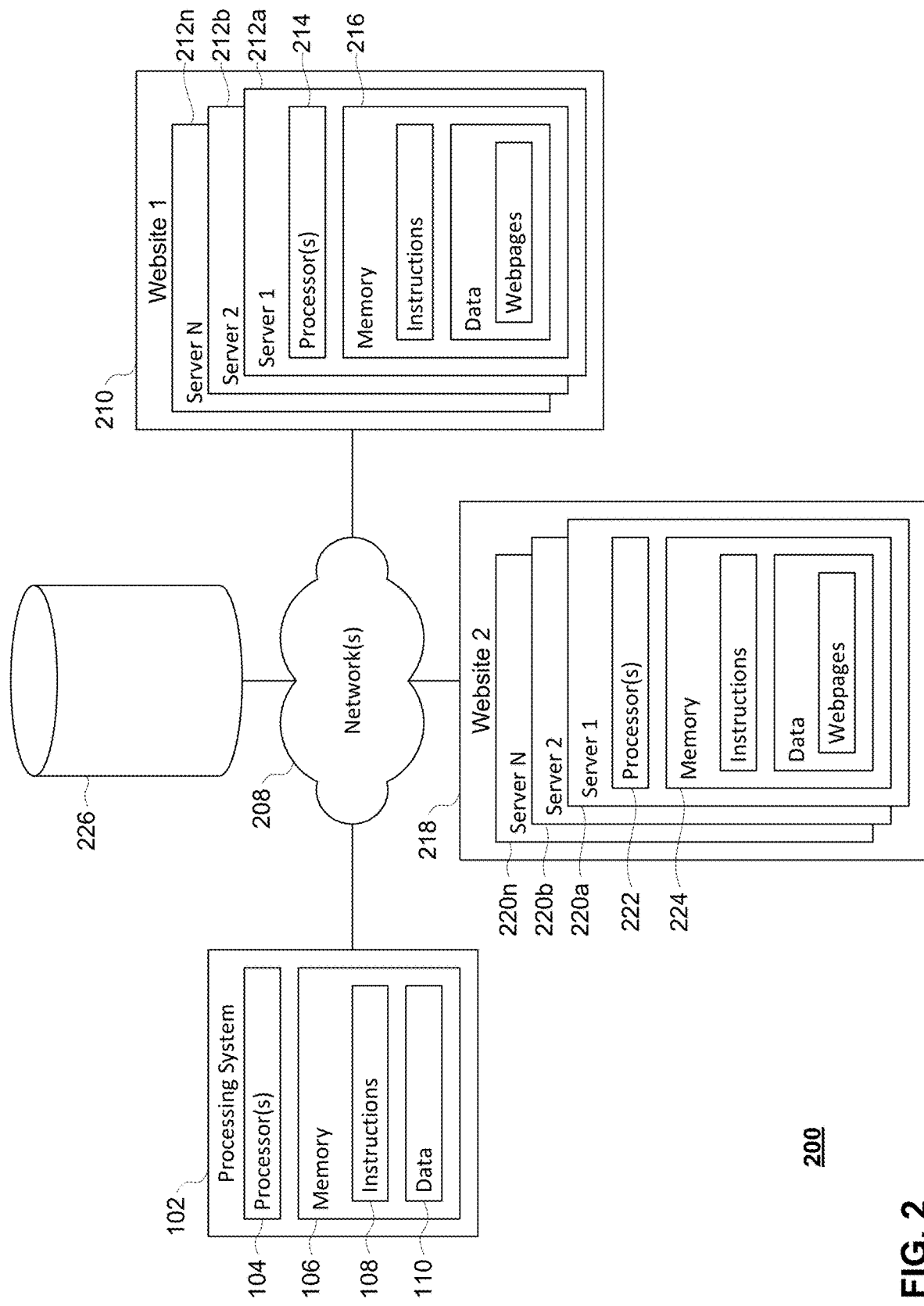
FIG. 2 is a functional diagram of an example system in accordance with aspects of the disclosure.

Further in this regard, FIG. 2 shows a high-level system diagram 200 in which the exemplary processing system 102 just described is shown in communication with various websites and/or remote storage systems over one or more networks 208, including websites 210 and 218 and remote storage system 226. In this example, websites 210 and 218 each include one or more servers 212a-212n and 220a-220n, respectively. Each of the servers 212a-212n and 220a-220n may have one or more processors (e.g., 214 and 222), and associated memory (e.g., 216 and 224) storing instructions and data, including the content of one or more webpages. Likewise, although not shown, remote storage system 226 may also include one or more processors and memory storing instructions and data. In some aspects of the technology, the processing system 102 may be configured to retrieve data, training examples, a set of images of given subjects, and/or input images of a given subject from one or more of website 210, website 218, and/or remote storage system 226 to be provided to a generative model for training or tuning the generative model, and/or to be used when generating images.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C #, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3A:
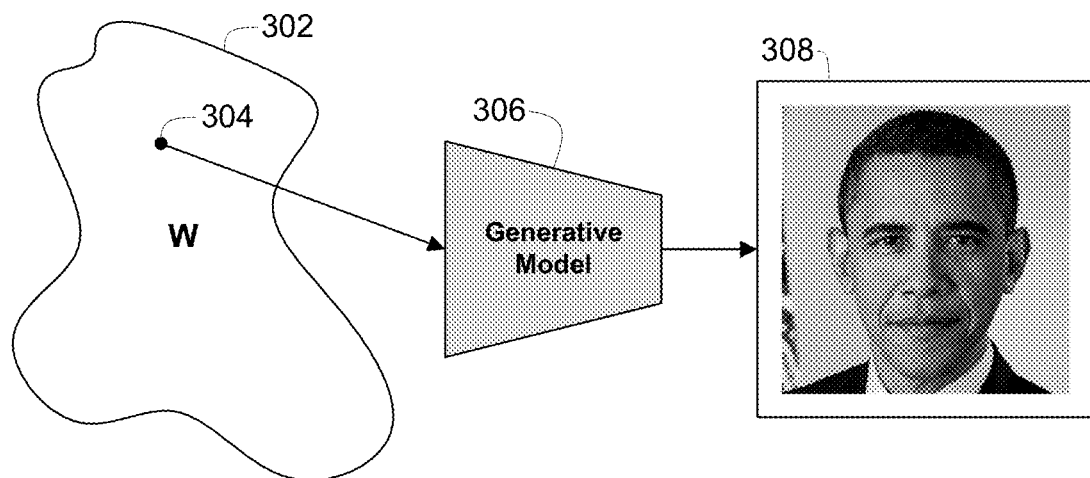
FIGS. 3A and 3B illustrate how different codes from within a latent vector space of a generative model may result in images of different subjects, in accordance with aspects of the disclosure.
Figure 3B:
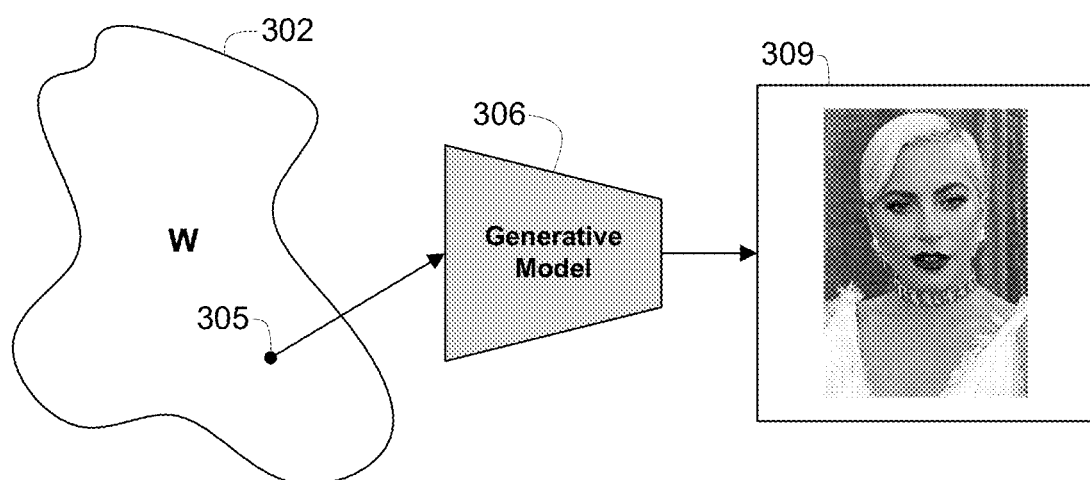

FIGS. 3A and 3B illustrate how different codes from within a latent vector space W (302) of a generative model 306 may result in images (308, 309) of different subjects, in accordance with aspects of the disclosure. In these examples, the generative model 306 may be any suitable model configured to generate an output image based on an input code, and the latent vector space W (302) represents the range of all possible input codes that can be provided to the generative model 306. In that regard, solely for purposes of simplifying the illustration, the latent vector space W (302) is shown in FIGS. 3A and 3B (and FIGS. 4A, 4B, 6, 10, and 11) being a two-dimensional space. However, the present technology may be applied to any suitable generative model (e.g., a GAN or bidirectional GAN ("BiGAN")) configured to generate an image based on an input vector of any suitable number of dimensions. For example, in some aspects of the technology, the generative model 306 may be a generative adversarial network (e.g., StyleGAN, StarGAN) configured to use a latent vector space W having 512 dimensions.

As shown in FIG. 3A, a code at point 304 of the latent vector space W (302) is fed to the generative model 306, thus producing an image 308. In order to illustrate the effects of the present technology, the examples set forth in FIGS. 3A, 3B, 4A, 4B, 10, and 11 each use images of subjects whose likenesses will be recognizable to many people. Thus, in the example of FIG. 3A, it has been assumed that the code at point 304 will produce an image 308 of Barack Obama (44$^{th}$ president of the United States). Likewise, in the example of FIG. 3B, it has been assumed that the code at point 305 will produce an image 309 of Lady Gaga (an American singer, songwriter, and actress, also known as Stefani Joanne Angelina Germanotta).

Figure 4A:
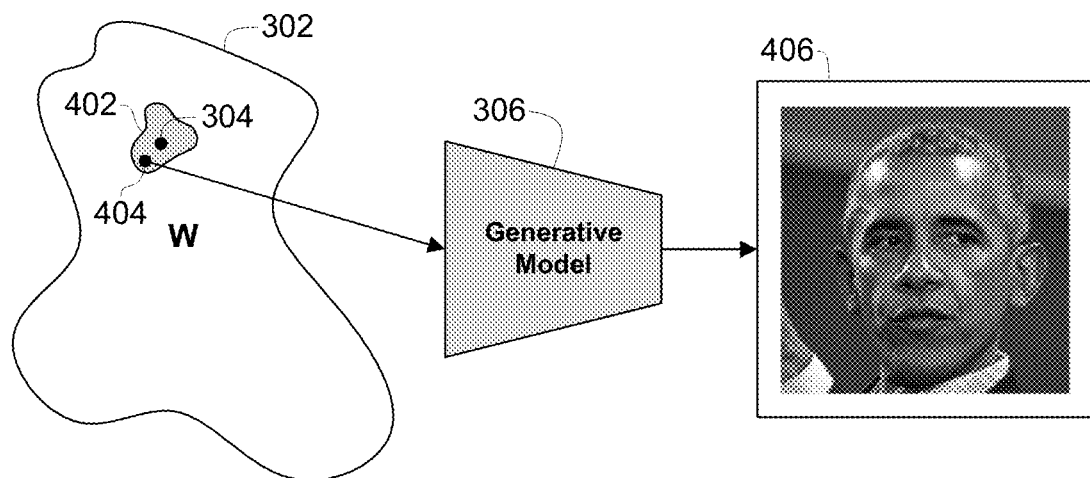
FIGS. 4A and 4B illustrate two different personalized priors within a latent vector space of a generative model, and how points within a given personalized prior may result in different images of a given subject, in accordance with aspects of the disclosure.
Figure 4B:
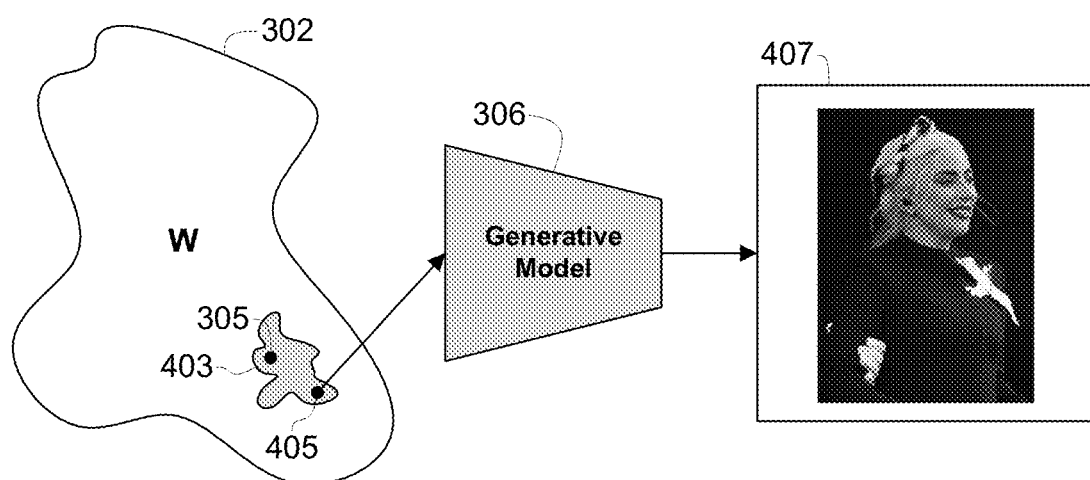

FIGS. 4A and 4B illustrate two different personalized priors 402, 403 within the latent vector space W (302) of a generative model 306, and further illustrate how points (e.g., 304 vs. 404, 305 vs. 405) within a given personalized prior may result in different images of a given subject, in accordance with aspects of the disclosure. The examples of FIGS. 4A and 4B both assume the use of the same latent vector space W (302) and same generative model 306 as used in FIGS. 3A and 3B, but further depict personal priors 402, 403 within the latent vector space W (302).

Personal priors 402 and 403 each represent a vector space within latent vector space W (302) including a subset of possible input codes that produce images that resemble a given subject. In this case, it is assumed that personal prior 402 represents a range of codes that produce images that resemble Barack Obama when provided to generative model 306. As such, personal prior 402 includes the point 304, representing the code that produced the image 308 of FIG. 3A, and another point 404, representing a code that produces a different image 406 of Barack Obama.

Likewise, it is assumed that personal prior 403 represents a range of codes that produce images that resemble Lady Gaga when provided to generative model 306. As such, personal prior 403 includes the point 304, representing the code that produced the image 309 of FIG. 3B, and another point 405, representing a code that produces a different image 407 of Lady Gaga.

Here as well, solely for purposes of simplifying the illustration, the personal priors 402 and 403 are shown in FIGS. 4A and 4B (and in FIGS. 6, 10, and 11) as being two-dimensional spaces. However, as the present technology may be applied to any suitable generative model configured to generate an image based on an input vector of any suitable number of dimensions, the personal priors 402 and 403 may likewise be vector spaces of any number of dimensions less than or equal to the number of dimensions in latent vector space W (302). Thus, for example, where the generative model 306 is a generative adversarial network configured to use a latent vector space W having 512 dimensions, the personal priors 402 and 403 may each be vector spaces of up to 512 dimensions. In addition, for clarity of illustration, the exemplary vector spaces 402 and 403 are shown being entirely separated. However, in practice, personal priors for different subjects may intersect one another.

Figure 5:
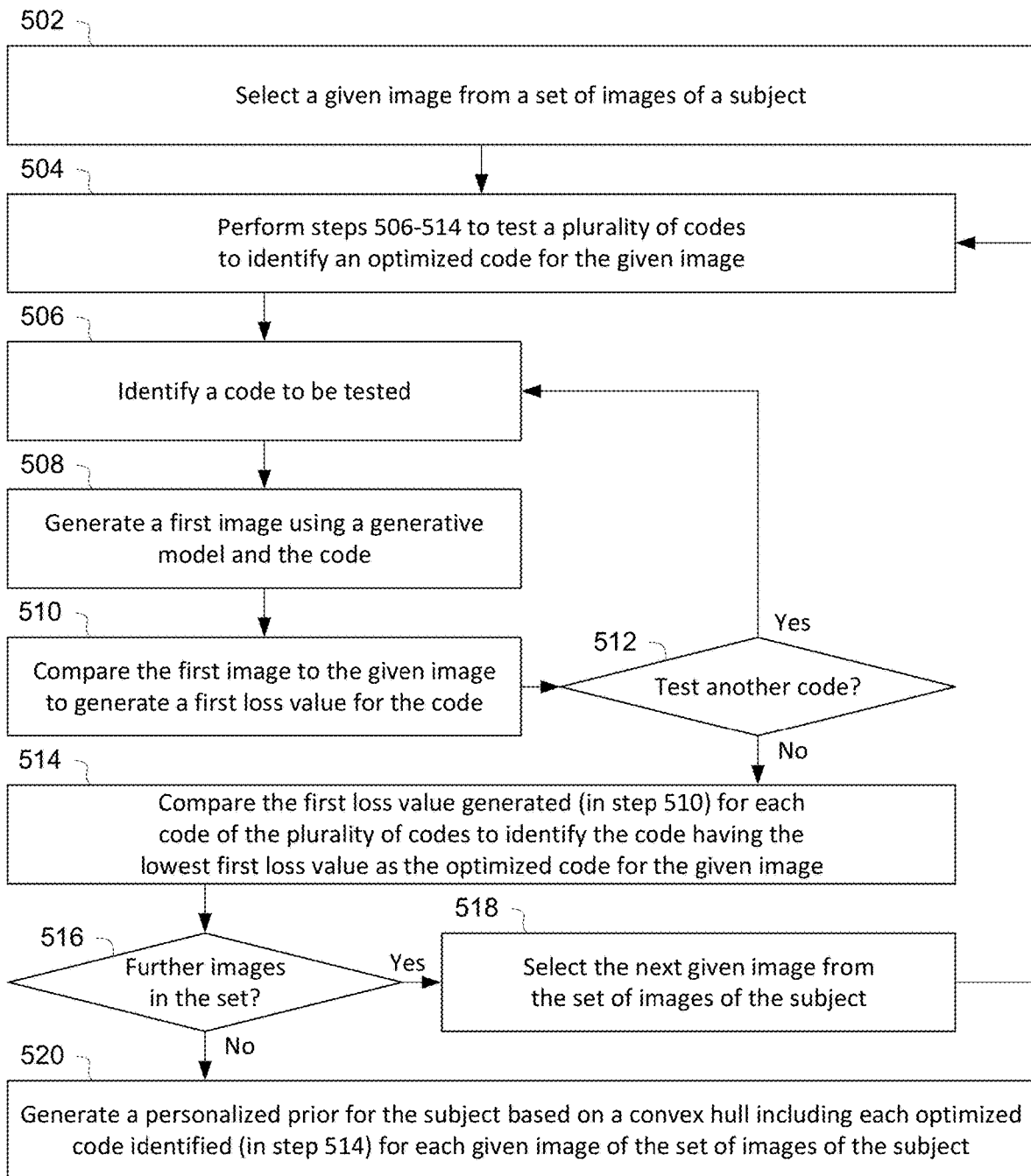
FIG. 5 sets forth an exemplary method for generating a personalized prior based on a set of images of a subject, in accordance with aspects of the disclosure.

FIG. 5 sets forth an exemplary method 500 for generating a personalized prior based on a set of images of a subject, in accordance with aspects of the disclosure.

In step 502, a processing system (e.g., processing system 102) selects a given image from a set of images of a subject. It will be understood that, a larger number of images will generally produce a more representative personal prior than a smaller number of images. In that regard, it has been found that somewhere between 100 and 200 images will generally enable the generative model to produce images that appear realistic and consistent with the subject's identity. However, other aspects may also impact how well the personal prior represents the subject's appearance. For example, if a subject's appearance has changed substantially (e.g., due to changes in hair styles, hair colors, adding or removing facial hair, or the passage of a large amount of time), it may be helpful to tailor the set of images to a particular phase so that the personal prior will reflect a single "look," and the images produced by the generative model will be consistent with that look. Likewise, for the same reasons, it may be helpful to confine the set of images to a single phase of life (e.g., infancy, childhood, adolescence, adulthood, etc.). On the other hand, variability in the set of images may also be important. For example, a set of images showing the subject's face solely from the front may not be as useful as a set of images showing the subject's face from a variety of different angles, different lighting conditions, etc. A personal prior generated from images that are too similar may confine the generative model too much, causing it to produce images that resemble the subject, but do not always appear realistic.

As shown in step 504, after the processing system has selected a given image, it will repeatedly perform steps 506-514 in order to test a plurality of codes to identify an optimized code for the given image. In that regard, in step 506, the processing system will identify a code to be tested in the current pass. This code may be identified based on any suitable selection criteria. For example, in some aspects of the technology, the processing system may be configured to blindly select a first code (e.g., using a random selection process, or a preselected value such as the mean of the latent vector space W), and then select each successive code (in each successive pass through step 506) based directly or indirectly on that first code using a suitable optimization regime. Thus, in some aspects, the processing system may be configured to use gradient descent to select each successive code based on the preceding code and an assessment of how closely an image generated based on the preceding code matched the given image (e.g., the first loss value generated in the most recent pass through step 510).

In step 508, the processing system generates a first image using a generative model (e.g., generative model 306) and the code (identified in this pass through step 506). The generative model may be configured to produce the first image in any suitable way, including as described above with respect to FIGS. 3A, 3B, 4A, and 4B.

In step 510, the processing system compares the first image (generated in this pass through step 508) to the given image (selected in step 502) to generate a first loss value for the code. The first loss value may be generated in any suitable way, using any suitable function. For example, in some aspects of the technology, the first loss value may be based on a comparison of the first image to the given image using a heuristic or learned similarity metric (e.g., learned perceptual image patch similarity ("LPIPS"), peak signal to noise ratio ("PSNR"), structural similarity index measure ("SSIM"), L1 or L2 losses, etc.).

In step 512, the processing system determines if another code should be tested. As it is assumed that there will be a plurality of codes tested, the first time that the processing system reaches step 512 it will automatically follow the "yes" arrow and return to step 506 so that a second code will be identified and tested. However, on all subsequent returns to step 512, the processing system may determine whether to test another code based on any suitable criteria. Thus, as mentioned above, in some aspects of the technology, the processing system may determine when to stop testing another code based on a suitable optimization regime such as gradient descent. In such a case, the determination in step 512 may be based on a comparison of the first loss value generated in the current pass through step 510 (or some other assessment of how closely the first image matches the given image) to one or more of the first loss values generated in preceding passes. For example, the processing system may be configured to stop testing successive codes when the first loss value generated in the current pass through step 510 is equal to or greater than the first loss value generated in the prior pass through step 510.

The processing system will thus cycle through steps 506-512 with each next code until it is determined at step 512 that enough codes have been tested. At that point, the processing system will follow the "no" arrow to step 514, where it will compare the first loss value generated (in step 510) for each code of the plurality of codes to identify the code having the lowest first loss value. That code with the lowest first loss value will be selected as the optimized code for the given image.

Then, in step 516, the processing system will determine if there are any further images in the set of images of the subject. If so, the processing system will follow the "yes" arrow to step 518, where the processing system will select the next given image to be tested. The processing system will then return to step 504 to test a plurality of codes to identify an optimized code for this new given image. In this way, steps 504-518 will repeat as described above until an optimized code has been identified for every image in the set of images of the subject. Once the optimized code has been selected (at step 514) for the last image in the set of images of the subject, the processing system will determine at step 516 that there are no further images in the set, and thus follow the "no" arrow to step 520.

In step 520, the processing system will generate a personalized prior for the subject based on a convex hull including each optimized code identified (in step 514) for each given image of the set of images of the subject. In that regard, in some aspects of the technology, the personalized prior may simply be the convex hull defined by each optimized code identified in step 514. In such a case, assuming there are a set of n optimized codes $\{x_1, x_2, \ldots, x_n\}$ the personalized prior will include any code c generated through a linear combination of the optimized codes according to Equations 1-3 below, where each of the coefficients (the alpha values $\alpha_1$ through $\alpha_n$) is greater than or equal to 0, and all of the coefficients sum to 1.

$$c = \alpha_1 x_1 + \alpha_2 x_2 + \ldots + \alpha_n x_n \quad (1)$$

$$\forall i : \alpha_i \geq 0 \quad (2)$$

$$\sum_{i=1}^{n} \alpha_i = 1 \quad (3)$$

Likewise, in some aspects of the technology, the personalized prior may be some subset of the convex hull defined by each optimized code identified in step 514, such as a set of some predetermined number (e.g., 100, 500, 1,000, 10,000, 100,000, 1,000,000) of codes or coefficient sets corresponding to a sampled set of points within the convex hull. Further, in some aspects of the technology, the personalized prior may be a simpler hull (e.g., one with fewer vertices) that fits within or substantially overlaps with the actual convex hull defined by each optimized code identified in step 514. In addition, in some aspects of the technology, the personalized prior may be based on the convex hull defined by Equations 1-3 above by encompassing a broader set of codes than those defined by Equations 1-3 above. For example, the personalized prior may include any code c generated according to Equations 1 and 3 above, in which the coefficients (the alpha values $\alpha_1$ through $\alpha_n$) are greater than or equal to some predetermined negative value (e.g., −0.01, −0.05, −0.1).

Figure 6:
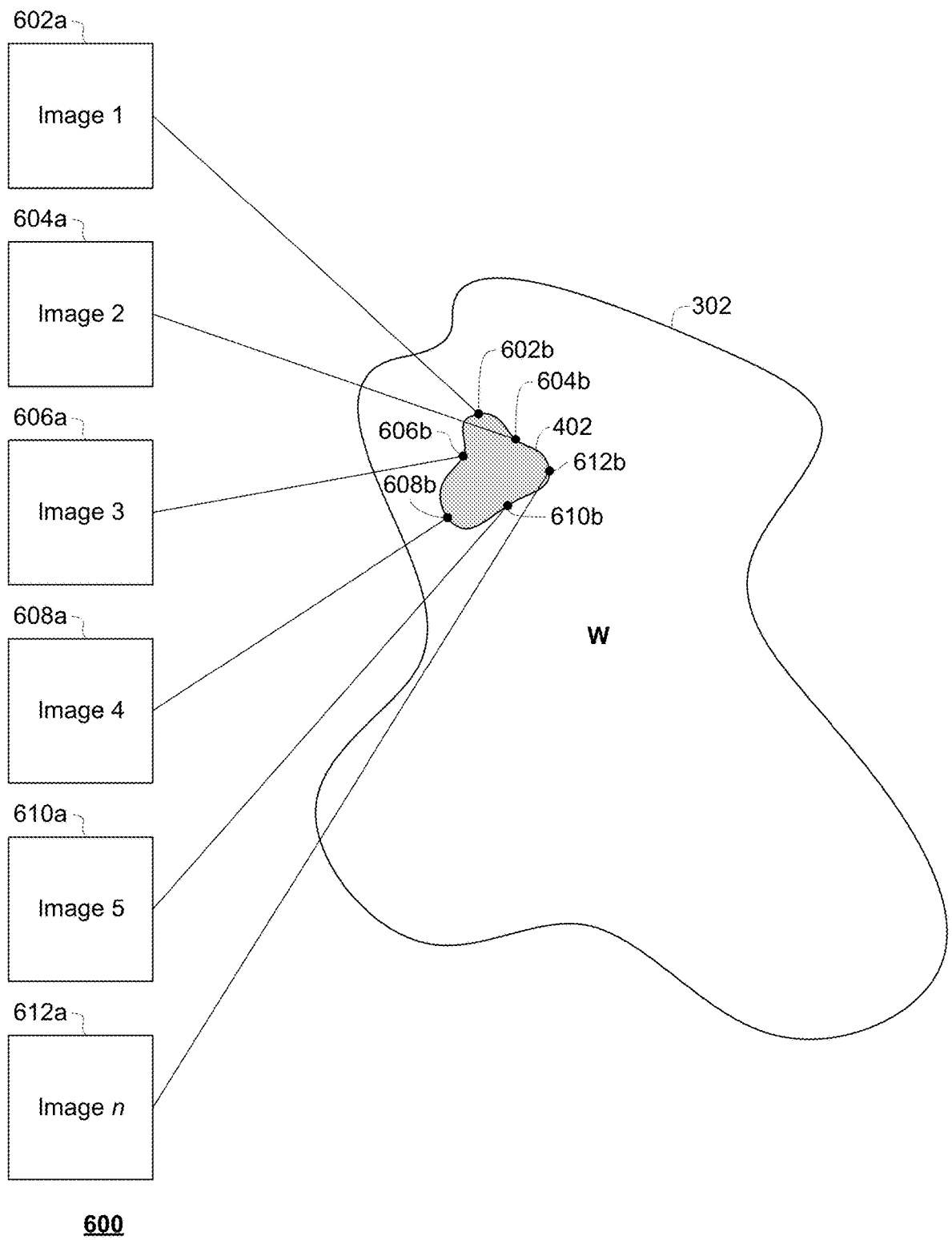
FIG. 6 illustrates how a given set of images may be used to generate the personalized prior of FIG. 4A, in accordance with aspects of the disclosure.

FIG. 6 illustrates how a given set of n images 602a-612a may be used to generate the personalized prior 402 of FIG. 4A, in accordance with aspects of the disclosure. In that regard, each image 602a-612a is assumed to be one of a set of n images of a subject, and the depicted lines show how these six selected images correspond to different optimized codes 602b-612b within the latent vector space W (302) of the generative model (e.g. generative model 306). These optimized codes 602b-612b may each be found according to steps 502-518 of the exemplary method of FIG. 5, as described further above. In addition, the exemplary diagram 600 of FIG. 6 illustrates how each of these optimized codes 602b-612b may be used (together with the optimized codes for the rest of the set of n images, not shown) to define a convex hull on which the personalized prior 402 is based, as described further above with respect to step 520 of FIG. 5. Again, solely for purposes of simplifying the illustration, the personal prior 403 of FIG. 6 is shown as being a two-dimensional space, and only six sample images are shown of the set of n images. However, the personal prior 403 may be based on any suitable number of points, and may be a vector space of any suitable number of dimensions less than or equal to the number of dimensions in latent vector space W (302), as explained above.

Figure 7:
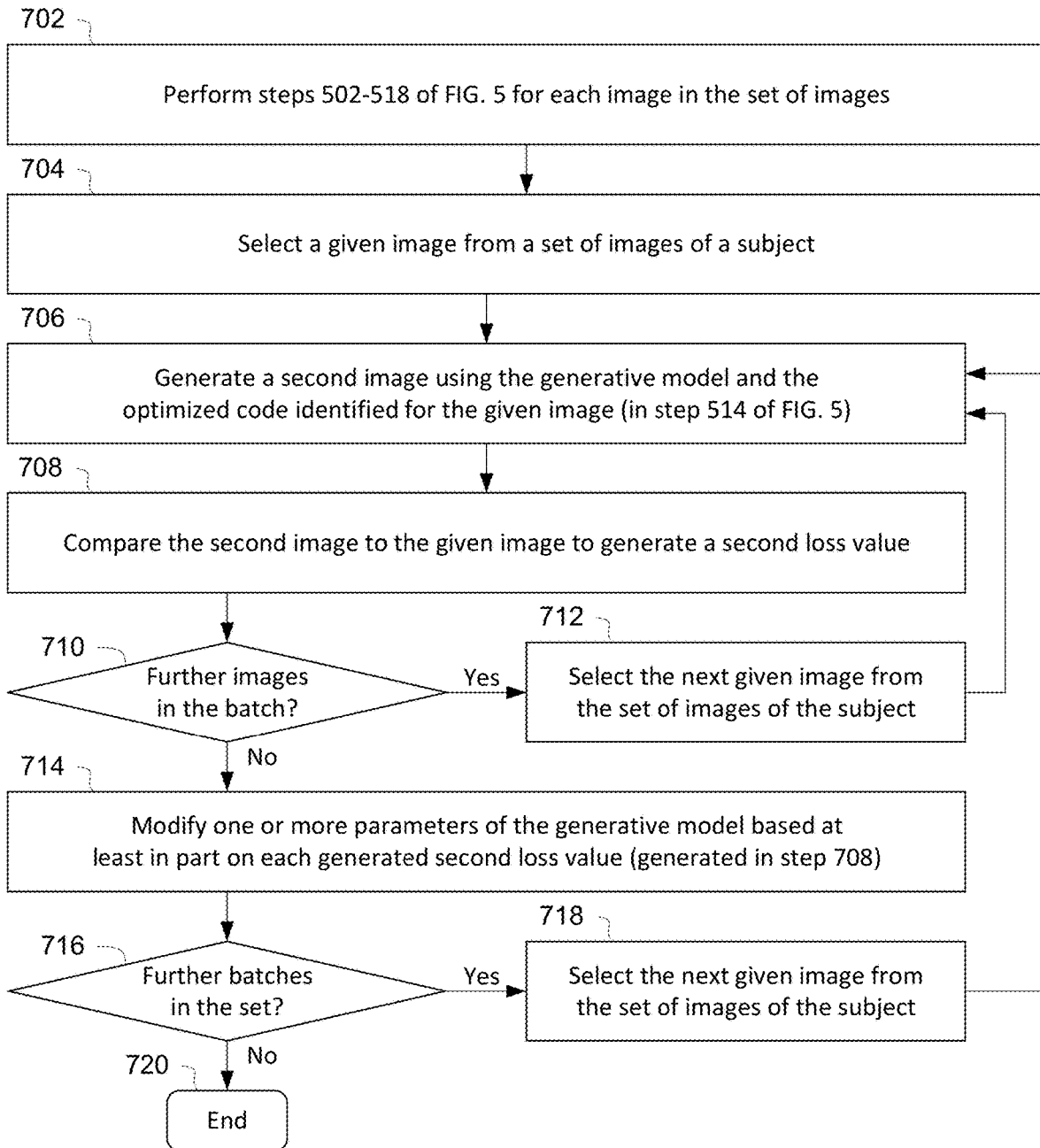
FIG. 7 sets forth an exemplary method for tuning a generative model following the identification of optimized codes for each image in the set of images according to the method of FIG. 5, in accordance with aspects of the disclosure.

FIG. 7 sets forth an exemplary method 700 for tuning a generative model following the identification of optimized codes for each image in the set of images according to the method of FIG. 5, in accordance with aspects of the disclosure. In that regard, exemplary method 700 represents a process that may optionally be performed after an optimized code has been identified (at step 514 of FIG. 5) for each image in the set of images.

Thus, in step 702, it is assumed that the processing system (e.g., processing system 102) will perform at least steps 502-518 of the exemplary method of FIG. 5 for each image in the set of images. Although the exemplary method of FIG. 7 shows steps 704-720 occurring after step 702, it will be understood that steps 704-720 may be performed in any suitable order relative to steps 502-518 of the exemplary method of FIG. 5. For example, in some aspects of the technology, the processing system may be configured to identify an optimized code for a given image of the set of images (in step 514 of FIG. 5), and to then perform steps 704-712 for that given image either prior to selecting the next given image (in step 518 of FIG. 5) or in parallel with testing a plurality of codes to identify an optimized code for the next given image (e.g. steps 504-514 of FIG. 5). In such a case, the processing system may further be configured to perform step 714 (after each batch of images is processed according to steps 704-712) in parallel with steps 504-518 of FIG. 5, such that the generative model's parameters are periodically updated as the optimized codes continue to be identified (in successive passes through step 518).

Regardless of timing, in step 704, the processing system selects a given image from a set of images of a subject. This set of images may be the entire set of images used in FIG. 5, or any suitable subset thereof. For example, in some aspects of the technology, the processing system may be configured to identify optimized codes for a set of 200 images of the subject according to steps 502-518 of FIG. 5, but then may be configured to tune the generative model (e.g., generative model 306) based on only 100 of those images.

In step 706, the processing system generates a second image using the generative model and the optimized code identified for the given image (in step 514 of FIG. 5). Here as well, the generative model may be configured to produce the second image in any suitable way, including as described above with respect to FIGS. 3A, 3B, 4A, and 4B. In addition, although step 706 references a "second image," it will be understood that this second image may in some instances be a copy of one of the "first images" generated in step 508 of FIG. 5. Thus, in some aspects of the technology, for any "given image" in the first batch of images, the processing system may be configured to use the "first image" (or a copy thereof) associated with the optimized code identified in step 514 of FIG. 5 as the "second image" of step 706, rather than generating the image a second time in step 706. However, once the processing system modifies one or more parameters of the generative model in step 714 (discussed below), the generative model will be changed such that each next optimized code will produce a different "second image" than that code would have produced previously. Accordingly, where method 700 is performed after method 500 (as opposed to in parallel with some or all of the steps of method 500), the processing system may be configured to generate new "second images" in each successive pass through step 706 (rather than using copies of a "first image" identified in step 508 of FIG. 5).

In step 708, the processing system compares the second image (generated in step 706) to the given image (selected in step 704) to generate a second loss value. Here as well, the second loss value may be generated in any suitable way, using any suitable function. For example, in some aspects of the technology, the second loss value may be based on a comparison of the second image to the given image using a heuristic or learned similarity metric (e.g., learned perceptual image patch similarity ("LPIPS"), peak signal to noise ratio ("PSNR"), structural similarity index measure ("SSIM")). In addition, although step 708 references a "second loss value," it will be understood that this second loss value may in some instances be a copy of the "lowest first loss values" identified in step 514 of FIG. 5 for that image. Thus, in some aspects of the technology, for any "given image" in the first batch of images, the processing system may be configured to use the "lowest first loss value" identified in step 514 of FIG. 5 for that given image as the "second loss value" of step 708, rather than generating a loss value anew in step 708. However, as already mentioned, once the processing system modifies one or more parameters of the generative model in step 714 (discussed below), the generative model will be changed such that each next optimized code will produce a different "second image" than that code would have produced previously, and thus a different "second loss value" when compared to the "given image." Accordingly, where method 700 is performed after method 500 (as opposed to in parallel with some or all of the steps of method 500), the processing system may be configured to generate new "second loss values" in each successive pass through step 708 (rather than using copies of the "lowest first loss value" identified in step 514 of FIG. 5).

In step 710, the processing system determines if there are further images in the batch. In that regard, the set of images may be kept whole, or broken into any suitable number of batches. Where the set of images has not been broken up, and there is thus one single "batch" containing every image in the "set of images" of the subject, the processing system will follow the "yes" arrow to step 712 to select the next given image from the set of images of the subject and repeat steps 706-710 for that newly selected image. This process will repeat until there are no further images remaining in the set of images, at which point the processing system will follow the "no" arrow to step 714. On the other hand, where the set of images is broken into two or more batches (e.g., a set of 200 images may be broken into two 100-image batches, four 50-image batches, ten 20-image batches, 200 single-image "batches," etc.), steps 704-712 will repeat for each image until the end of a batch is reached.

As shown in step 714, after a "second loss value" has been generated (in step 708) for every image in the batch, the processing system modifies one or more parameters of the generative model based at least in part on each generated second loss value. The processing system may be configured to modify the one or more parameters based on these generated second loss values in any suitable way and at any suitable interval. Thus, in some aspects of the technology, each "batch" may include a single image such that the processing system will conduct a back-propagation step in which it modifies the one or more parameters of the generative model every time a second loss value is generated. Likewise, where each "batch" includes two or more images, the processing system may be configured to combine each of the "second loss values" generated (in step 708) for each image of that batch into an aggregate loss value (e.g., by summing or averaging the multiple second loss values), and modify the one or more parameters of the generative model based on that aggregate loss value.

In step 716, the processing system determines if there are further batches in the set of images of the subject. Where the set of images has not been broken up, and there is thus one single "batch" containing every image in the "set of images" of the subject, the determination in step 716 will automatically be "no," and the method 700 will then end as shown in step 720. However, where the set of images has been broken into two or more batches, the processing system will follow the "yes" arrow to step 718 to select the next given image from the set of images of the subject. This will then start another set of passes through steps 706-714 for each image in the next batch of images, and the process will continue until there are no further batches remaining, at which point the processing system will follow the "no" arrow to step 720.

Although method 700 is shown as ending in step 720 once all images have been used to tune the generative model, it will be understood that method 700 may be repeated any suitable number of times using the same set of images until its outputs for each optimized code produce images sufficiently close to each given image. In that regard, in some aspects of the technology, the processing system may be configured to aggregate all of the second loss values generated during a given pass through method 700, and determine whether to repeat method 700 for the set of images based on that aggregate loss value. For example, in some aspects of the technology, the processing system may be configured to repeat method 700 for the set of images if the aggregate loss value for the most recent pass through method 700 was greater than some predetermined threshold. Likewise, in some aspects, the processing system may be configured to use gradient descent to make this determination, and thus repeat method 700 for the set of images until the aggregate loss value on a given pass through method 700 is equal to or greater than the aggregate loss value from the pass before it.

Figure 8:
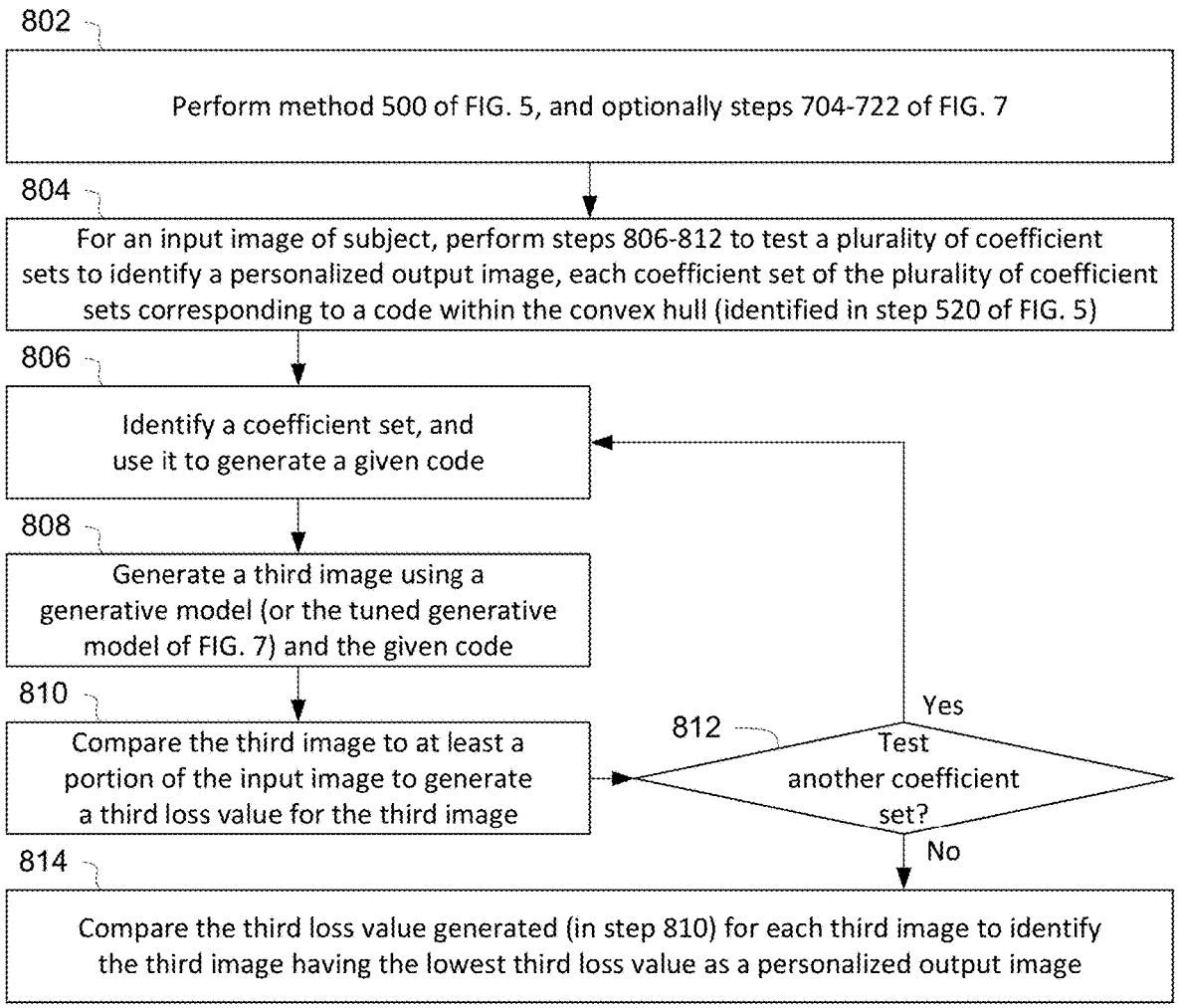
FIG. 8 sets forth an exemplary method for generating a personalized output image based on an input image and a personalized prior generated according to the methods of FIG. 5 or 7, in accordance with aspects of the disclosure.

FIG. 8 sets forth an exemplary method 800 for generating a personalized output image based on an input image and a personalized prior generated according to the methods of FIG. 5 or 7, in accordance with aspects of the disclosure. In that regard, exemplary method 800 represents a process that may optionally be performed after at least a personalized prior has been generated (at step 520 of FIG. 5), and which may also be performed after the generative model has been further tuned according to the method of FIG. 7. Thus, in step 802, it is assumed that the processing system (e.g., processing system 102) will perform at least method 500 of FIG. 5 for each image in the set of images, and optionally steps 704-720 of FIG. 7.

As described above, after the processing system has generated a personalized prior (using method 500 of FIG. 5) and optionally tuned the generative model (using method 700 of FIG. 7), the personalized prior may be used to generate different candidate coefficient sets, and the codes corresponding to the candidate coefficient sets may then be used to generate candidate images for a given image enhancement task. Thus, as shown in step 804, for a particular input image of a subject, the processing system will repeatedly perform steps 806-812 in order to test a plurality of coefficient sets to identify a personalized output image, where each coefficient set of the plurality of coefficient sets corresponds to a code within the convex hull (identified in step 520 of FIG. 5).

In each pass through step 806, the processing system identifies a coefficient set of the plurality of coefficient sets, and use it to generate a given code. This coefficient set may be identified based on any suitable selection criteria. For example, in some aspects of the technology, the processing system may be configured to blindly select a first coefficient set (e.g., using a random selection process, or a preselected value such as the mean of the vector space represented in the personalized prior), and then select each successive coefficient set (in each successive pass through step 806) based directly or indirectly on that first coefficient set using a suitable optimization regime. Thus, in some aspects, the processing system may be configured to use gradient descent to select each successive coefficient set based on the preceding coefficient set and an assessment of how closely an image generated based on the preceding coefficient set matched the input image (e.g., the third loss value generated in the most recent pass through step 810).

In step 808, the processing system generates a third image using a generative model (e.g., generative model 306, or the tuned generative model that results from one or more passes through steps 704-720 of FIG. 7) and the given code (generated in this pass through step 806). Here as well, the generative model may be configured to produce the third image in any suitable way, including as described above with respect to FIGS. 3A, 3B, 4A, and 4B.

In step 810, the processing system compares the third image (generated in this pass through step 808) to the input image of the subject to generate a third loss value for the third image. The third loss value may be generated in any suitable way, using any suitable function. For example, in some aspects of the technology, the third loss value may be based on a comparison of the third image to the input image using a heuristic or learned similarity metric (e.g., learned perceptual image patch similarity ("LPIPS"), peak signal to noise ratio ("PSNR"), structural similarity index measure ("SSIM")).

In step 812, the processing system determines if another coefficient set should be tested. As it is assumed that there will be a plurality of coefficient sets tested, the first time that the processing system reaches step 812 it will automatically follow the "yes" arrow and return to step 806 so that a second coefficient set will be identified and tested. However, on all subsequent returns to step 812, the processing system may determine whether to test another coefficient set based on any suitable criteria. Thus, as mentioned above, in some aspects of the technology, the processing system may determine when to stop testing another coefficient set based on a suitable optimization regime such as gradient descent. In such a case, the determination in step 812 may be based on a comparison of the third loss value generated in the current pass through step 810 (or some other assessment of how closely the third image matches the input image) to one or more of the third loss values generated in preceding passes. For example, the processing system may be configured to stop testing successive coefficient sets when the third loss value generated in the current pass through step 810 is equal to or greater than the third loss value generated in the prior pass through step 810.

The processing system will thus cycle through steps 806-812 with each next coefficient set until it is determined at step 812 that enough coefficient sets have been tested. At that point, the processing system will follow the "no" arrow to step 814, where it will compare the third loss value generated (in step 810) for each third image to identify the third image having the lowest third loss value. That third image with the lowest third loss value will be used as the personalized output image. In this way, method 800 may be used to produce a personalized output image that is both generated using a code within the personalized prior (thus making it more likely to resemble the subject than it would be if the code were not so confined), and which is optimized to closely match the input image (thus ensuring that in performing the image editing or enhancement task, the image produced by the model remains consistent with what can be gleaned from the input image).

Figure 9:
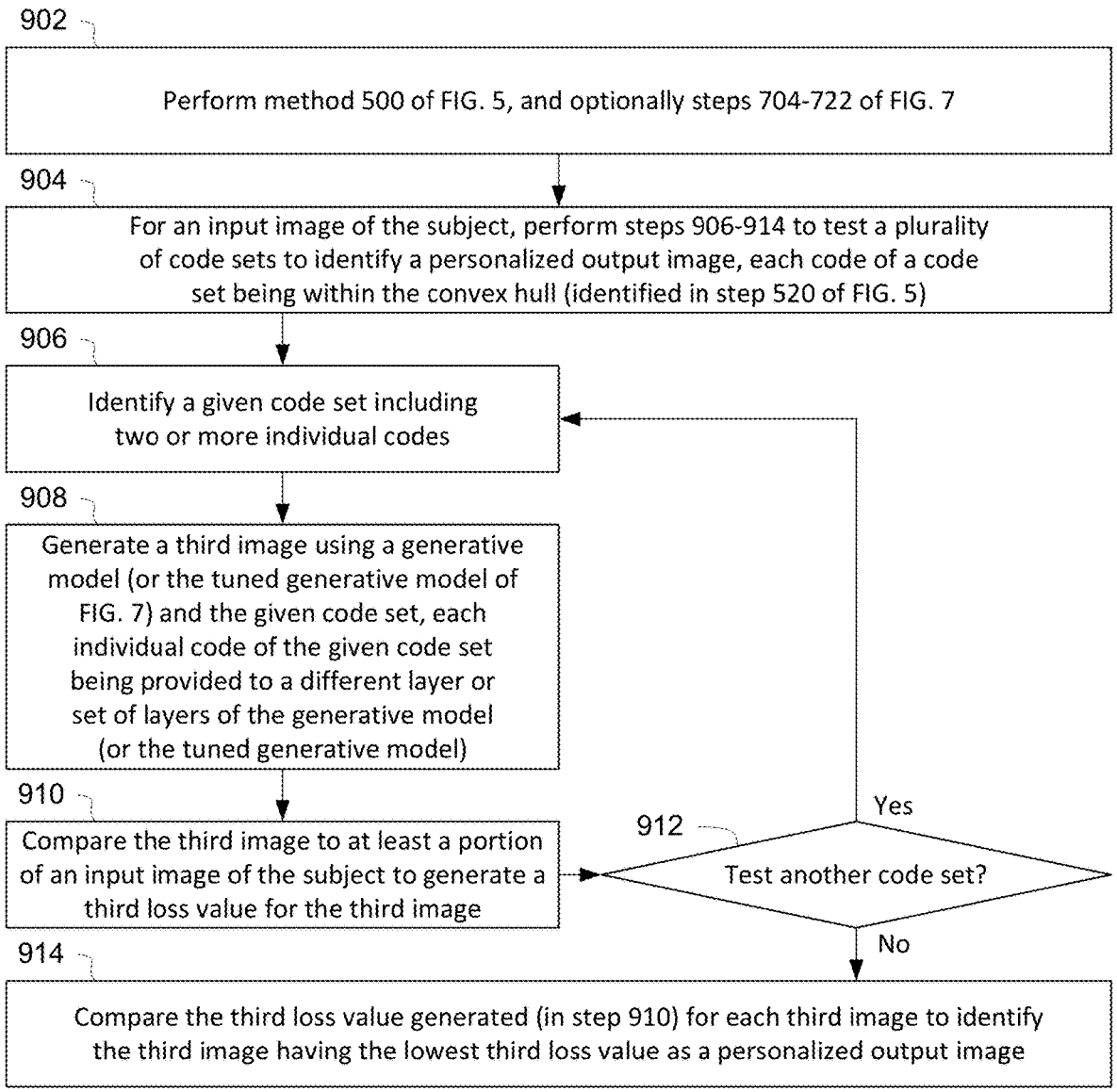
FIG. 9 sets forth an exemplary method for generating a personalized output image based on an input image and a personalized prior generated according to the methods of FIG. 5 or 7, in accordance with aspects of the disclosure.

FIG. 9 sets forth another exemplary method 900 for generating a personalized output image based on an input image and a personalized prior generated according to the methods of FIG. 5 or 7, in accordance with aspects of the disclosure. In that regard, exemplary method 900 also represents a process that may optionally be performed after at least a personalized prior has been generated (at step 520 of FIG. 5) and which may also be performed after the generative model has been further tuned according to the method of FIG. 7. The only difference between method 800 of FIG. 8 and method 900 of FIG. 9 is that in each pass through steps 906-912, a given set of codes will be tested, where each individual code in the given set of codes is within the convex hull identified in step 520 of FIG. 5.

Thus, as above, in step 902, it is assumed that the processing system (e.g., processing system 102) will perform at least method 500 of FIG. 5 for each image in the set of images, and optionally steps 704-720 of FIG. 7. Likewise, as shown in step 904, for a particular input image of a subject, the processing system will repeatedly perform steps 906-912 in order to test a plurality of code sets to identify a personalized output image, where each code of a code set is within the convex hull (identified in step 520 of FIG. 5).

In each pass through step 906, the processing system identifies a given code set including two or more individual codes. Here again, this given code set may be identified based on any suitable selection criteria. For example, in some aspects of the technology, the processing system may be configured to blindly select a first given code set (e.g., using a random selection process, or by assigning to each individual code a preselected value such as the mean of the vector space represented in the personalized prior), and then select each successive code set (in each successive pass through step 906) based directly or indirectly on that first given code set using a suitable optimization regime. Thus, in some aspects, the processing system may be configured to use gradient descent to select each successive code set based on the preceding code set and an assessment of how closely an image generated based on the preceding code set matched the input image (e.g., the third loss value generated in the most recent pass through step 910).

In step 908, the processing system generates a third image using a generative model (e.g., generative model 306, or the tuned generative model that results from one or more passes through steps 704-720 of FIG. 7) and the given code set (generated in this pass through step 906). In that regard, in step 908, the processing system will provide each individual code of the given code set to a different layer or set of layers of the generative model. Here as well, the generative model may be configured to produce the third image in any suitable way, including as described above with respect to FIGS. 3A, 3B, 4A, and 4B.

In step 910, the processing system compares the third image (generated in this pass through step 908) to the input image of the subject to generate a third loss value for the third image. Here as well, the third loss value may be generated in any suitable way, using any suitable function. For example, in some aspects of the technology, the third loss value may be based on a comparison of the third image to the input image using a heuristic or learned similarity metric (e.g., learned perceptual image patch similarity ("LPIPS"), peak signal to noise ratio ("PSNR"), structural similarity index measure ("SSIM")).

In step 912, the processing system determines if another code set should be tested. As it is assumed that there will be a plurality of code sets tested, the first time that the processing system reaches step 912 it will automatically follow the "yes" arrow and return to step 906 so that a second code set will be identified and tested. However, on all subsequent returns to step 912, the processing system may determine whether to test another code set based on any suitable criteria. Thus, as mentioned above, in some aspects of the technology, the processing system may determine when to stop testing another code set based on a suitable optimization regime such as gradient descent. In such a case, the determination in step 912 may be based on a comparison of the third loss value generated in the current pass through step 910 (or some other assessment of how closely the third image matches the input image) to one or more of the third loss values generated in preceding passes. For example, the processing system may be configured to stop testing successive code sets when the third loss value generated in the current pass through step 910 is equal to or greater than the third loss value generated in the prior pass through step 910.

Similar to method 800, the processing system will thus cycle through steps 906-912 with each next code set until it is determined at step 912 that enough code sets have been tested. At that point, the processing system will follow the "no" arrow to step 914, where it will compare the third loss value generated (in step 910) for each third image to identify the third image having the lowest third loss value. Here as well, the third image identified with the lowest third loss value will be used as the personalized output image.

Figure 10:
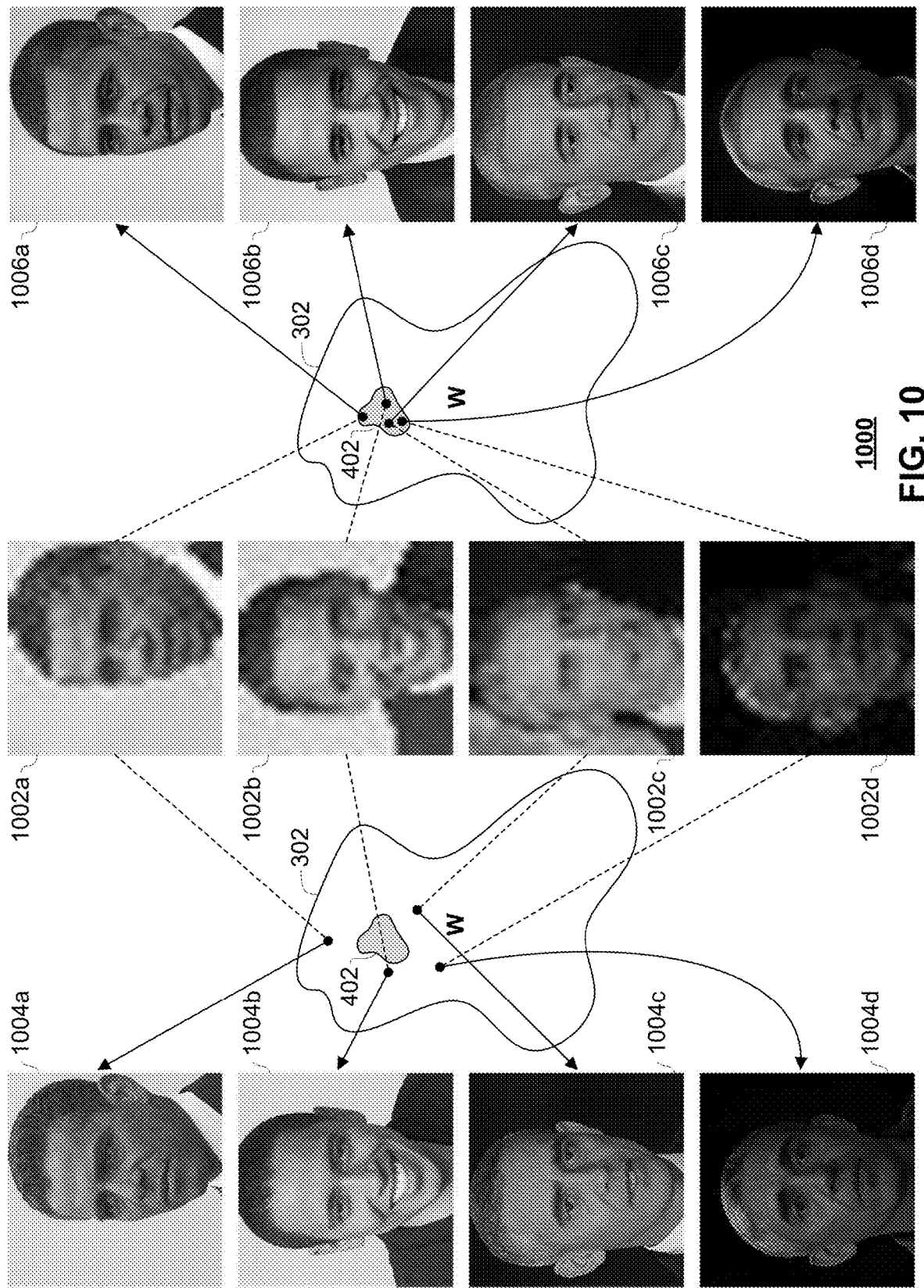
FIG. 10 shows a comparative illustration of how a generative model may complete four exemplary image enhancement tasks with and without using the personal prior of FIG. 4A, in accordance with aspects of the disclosure.

FIG. 10 is a diagram 1000 showing a comparative illustration of how a generative model (e.g., generative model 306) may complete four exemplary image enhancement tasks with and without using the personal prior 402 of FIG. 4A, in accordance with aspects of the disclosure.

In FIG. 10, a column of four input images 1002a-1002d are shown in the center of the diagram 1000. As it is assumed that the generative model will be tasked with producing an output image that resembles the input image but has improved resolution, each of input images 1002a-1002d is blurry.

The left column of images, 1004a-1004d, shows potential outputs of the generative model where it is not confined to choosing codes within any particular portion of its latent vector space W (302). In that regard, a dashed line connects each input image to a point within the latent vector space W (302) that represents the code that the generative model ended up selecting (e.g., after a selection process such as the ones described above with respect to method 800 of FIG. 8 or method 900 of FIG. 9), and an arrow connects that point to the corresponding output image that the generative model produces based on that code. As can be seen, while the output images 1004a-1004d are each visually consistent with their respective input images 1002a-1002d, the output images do not all appear to be of the same subject.

In contrast, the right column of images, 1006a-1006d, shows potential outputs of the generative model where it is confined to choosing codes within the personal prior 402 of FIG. 4A. Here as well, a dashed line connects each input image to a point within the personal prior 402 that represents the code that the generative model ended up selecting (e.g., after a selection process such as the ones described above with respect to method 800 of FIG. 8 or method 900 of FIG. 9), and an arrow connects that point to the corresponding output image that the generative model produces based on that code. As can be seen, this ends up producing output images 1006a-1006d that are both visually consistent with their respective input images 1002a-1002d, and all appear to be of the same subject. Specifically, as personalized prior 402 of FIG. 4A represents a range of codes that produce images that resemble Barack Obama when provided to generative model 306 (as discussed above), each of the output images 1006a-1006d appears to show an image of Barack Obama that is visually consistent with the input images 1002a-1002d.

Figure 11:
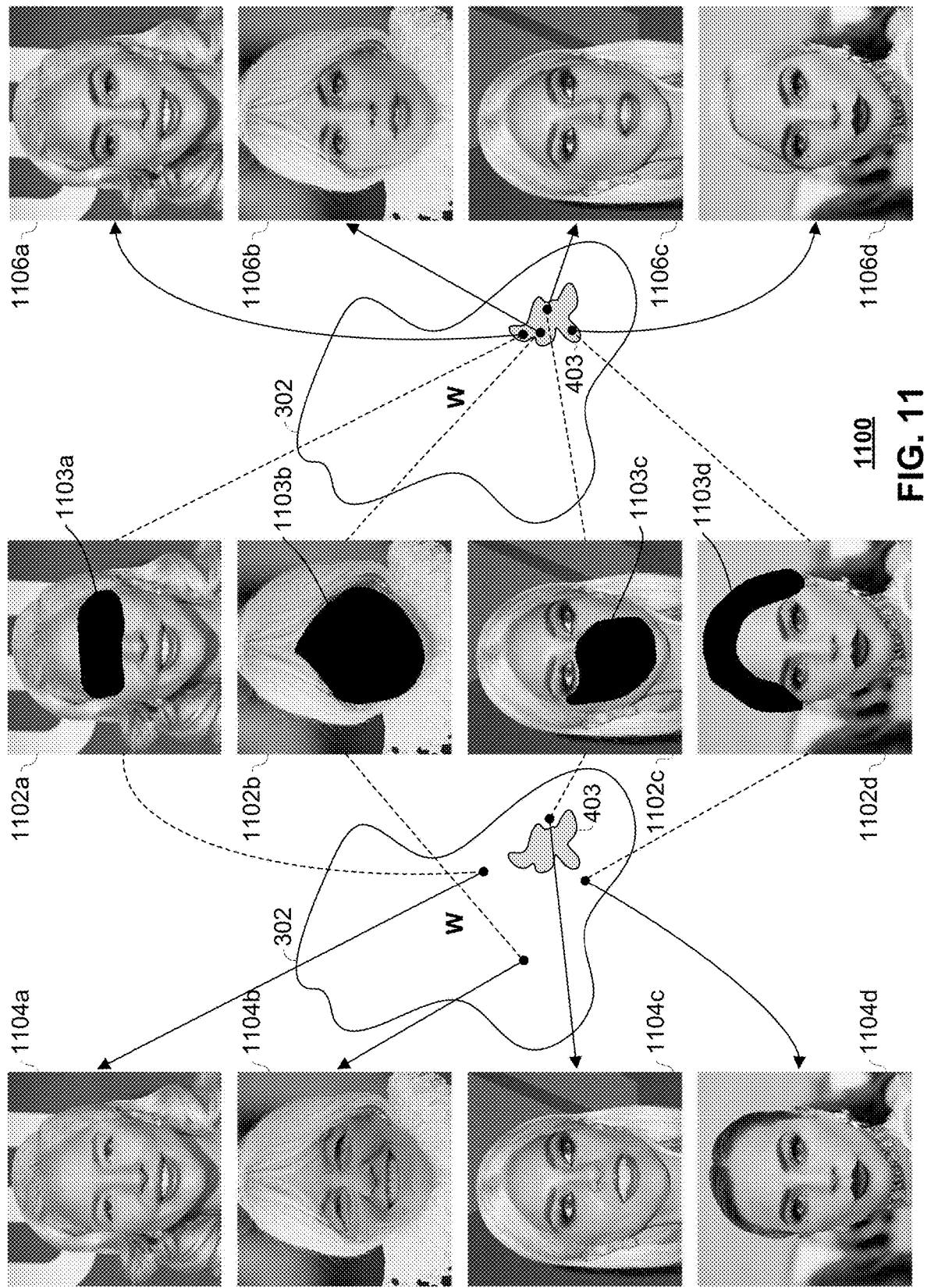
FIG. 11 shows a comparative illustration of how a generative model may complete four exemplary image inpainting tasks with and without using the personal prior of FIG. 4B, in accordance with aspects of the disclosure.

FIG. 11 is a diagram 1100 showing a comparative illustration of how a generative model (e.g., generative model 306) may complete four exemplary image inpainting tasks with and without using the personal prior 403 of FIG. 4B, in accordance with aspects of the disclosure.

Here as well, a column of four input images 1102a-1102d are shown in the center of the diagram 1000. As it is assumed that the generative model will be tasked with producing an output image that resembles the input image but fills in a masked portion, each of input images 1102a-1102d includes a black mask 1103a-1103d representing the pixels to be replaced.

In diagram 1100, the left column of images, 1104a-1104d, shows potential outputs of the generative model where it is not confined to choosing codes within any particular portion of its latent vector space W (302). Here again, a dashed line connects each input image to a point within the latent vector space W (302) that represents the code that the generative model ended up selecting (e.g., after a selection process such as the ones described above with respect to method 800 of FIG. 8 or method 900 of FIG. 9), and an arrow connects that point to the corresponding output image that the generative model produces based on that code. As can be seen, while the output images 1104a-1104d are each visually consistent with the unmasked portion of their respective input images 1102a-1102d, the output images do not all appear to be of the same subject.

In contrast, the right column of images, 1106a-1106d, shows potential outputs of the generative model where it is confined to choosing codes within the personal prior 403 of FIG. 4B. Here as well, a dashed line connects each input image to a point within the personal prior 403 that represents the code that the generative model ended up selecting (e.g., after a selection process such as the ones described above with respect to method 800 of FIG. 8 or method 900 of FIG. 9), and an arrow connects that point to the corresponding output image that the generative model produces based on that code. As can be seen, this ends up producing output images 1106a-1106d that are both visually consistent with their respective input images 1102a-1102d, and all appear to be of the same subject. Specifically, as personalized prior 403 of FIG. 4B represents a range of codes that produce images that resemble Lady Gaga when provided to generative model 306 (as discussed above), each of the output images 1106a-1106d appears to show an image of Lady Gaga that is visually consistent with the unmasked portions of input images 1102a-1102d.

Accordingly, diagrams 1000 and 1100 both illustrate examples of how a personalized prior may be used to focus the codes used by a generative model such that it may produce output images that are visually consistent both with the input image, and a particular subject's identity. As such, where the subject of the input image is already known, a personalized prior may be selected and used so that the generative model will be biased toward producing more representative, and thus better, output images.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method, comprising:
  for each given image of a set of images of a subject:
    generating, by one or more processors, a loss value for each code of a plurality of codes associated with the given image; and
    comparing, using the one or more processors, the loss value generated for each code of the plurality of codes to identify an optimized code for the given image having a lowest loss value; and generating, using the one or more processors, a personalized prior for the subject including each optimized code identified for each given image of the set of images of the subject.

2. The method of claim 1, further comprising:
for the optimized code identified for each given image of the set of images of the subject:
generating a selected image using a generative model and the optimized code; and
comparing, using the one or more processors, the selected image to the given image to generate a second loss value.

3. The method of claim 2, further comprising modifying, using the one or more processors, one or more parameters of the generative model based at least in part on each generated second loss value to create a tuned generative model.

4. The method of claim 3, further comprising:
identifying, using the one or more processors, a plurality of coefficient sets, each coefficient set of the plurality of coefficient sets corresponding to a code within a convex hull;
for each given coefficient set of the plurality of coefficient sets:
generating, using the one or more processors, another image using the tuned generative model and a given code corresponding to the given coefficient set; and
comparing, using the one or more processors, the other image to at least a portion of an input image of the subject to generate another loss value for the other image; and
comparing, using the one or more processors, the other loss value generated for other image to identify the other image having a lowest loss value as a personalized output image.

5. The method of claim 4, wherein the plurality of coefficient sets includes a first coefficient set, and a plurality of successive coefficient sets selected based directly or indirectly on the first coefficient set using gradient descent.

6. The method of claim 4, wherein the input image of the subject includes a first portion of pixels preserved from an original image of the subject, and a mask in place of a second portion of pixels from the original image of the subject.

7. The method of claim 6, wherein comparing, using the one or more processors, the other image to at least a portion of the input image of the subject to generate the other loss value comprises comparing the other image to the first portion of pixels.

8. The method of claim 4, wherein the input image has a first resolution, and the personalized output image has a second resolution that is higher than the first resolution.

9. The method of claim 1, further comprising:
identifying, using the one or more processors, a plurality of coefficient sets, each coefficient set of the plurality of coefficient sets corresponding to a code within a convex hull;
for each given coefficient set of the plurality of coefficient sets:
generating, using the one or more processors, a new image according to a given code corresponding to the given coefficient set; and
comparing, using the one or more processors, the new image to at least a portion of an input image of the subject to generate a loss value for the new image; and
identifying a given one of the new images having a lowest loss value as a personalized output image.

10. The method of claim 1, further comprising:
identifying, using the one or more processors, a plurality of code sets, each code set of the plurality of code sets including two or more individual codes, each individual code corresponding to a coefficient set of a plurality of coefficient sets; and
identifying a generated image having a lowest loss value as a personalized output image.

11. The method of claim 1, wherein the plurality of codes includes a first code, and a plurality of successive codes selected based directly or indirectly on the first code using gradient descent.

12. The method of claim 1, further comprising:
prior to generating the loss value for each code of the plurality of codes:
generating a first image using a generative model and the code;
wherein generating the loss value includes comparing, using the one or more processors, the first image to the given image.

13. A processing system comprising:
memory storing a generative model; and
one or more processors coupled to the memory and configured to generate a personalized prior for a subject for use with the generative model, by:
for each given image of a set of images of the subject generate a loss value for each code of a plurality of codes associated with the given image; and
compare the loss value generated for each code of the plurality of codes to identify an optimized code for the given image having the lowest loss value; and
generate the personalized prior for the subject including each optimized code identified for each given image of the set of images of the subject.

14. The processing system of claim 13, wherein, for the optimized code identified for each given image of the set of images of the subject, the one or more processors are further configured to:
generate a selected image using the generative model and the optimized code; and
compare the selected image to the given image to generate a second loss value.

15. The processing system of claim 14, wherein the one or more processors are further configured to modify one or more parameters of the generative model based at least in part on each generated second loss value to create a tuned generative model.

16. The processing system of claim 15, wherein the one or more processors are further configured to:
identify a plurality of coefficient sets, each coefficient set of the plurality of coefficient sets corresponding to a code within a convex hull;
for each given coefficient set of the plurality of coefficient sets:
generate another image using the tuned generative model and a given code corresponding to the given coefficient set; and
compare the other image to at least a portion of an input image of the subject to generate another loss value for the other image; and
compare the other loss value generated for other image to identify the other image having a lowest loss value as a personalized output image.

17. The processing system of claim 16, wherein the plurality of coefficient sets includes a first coefficient set, and a plurality of successive coefficient sets selected based directly or indirectly on the first coefficient set using gradient descent.

18. The processing system of claim 16, wherein the input image of the subject includes a first portion of pixels preserved from an original image of the subject, and a mask in place of a second portion of pixels from the original image of the subject.

19. The processing system of claim 16, wherein the input image has a first resolution, and the personalized output image has a second resolution that is higher than the first resolution.

\* \* \* \* \*